Patented Apr. 12, 1927.

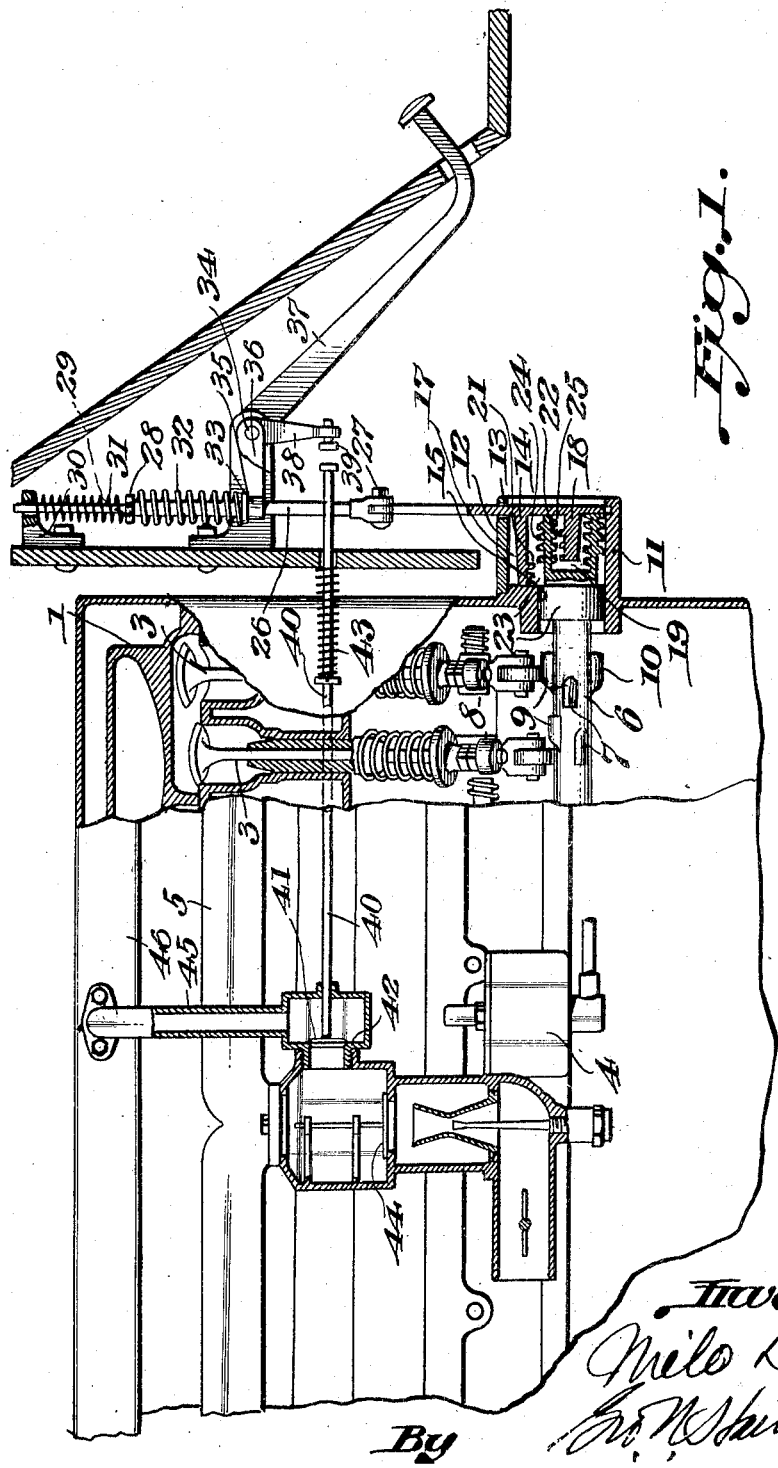

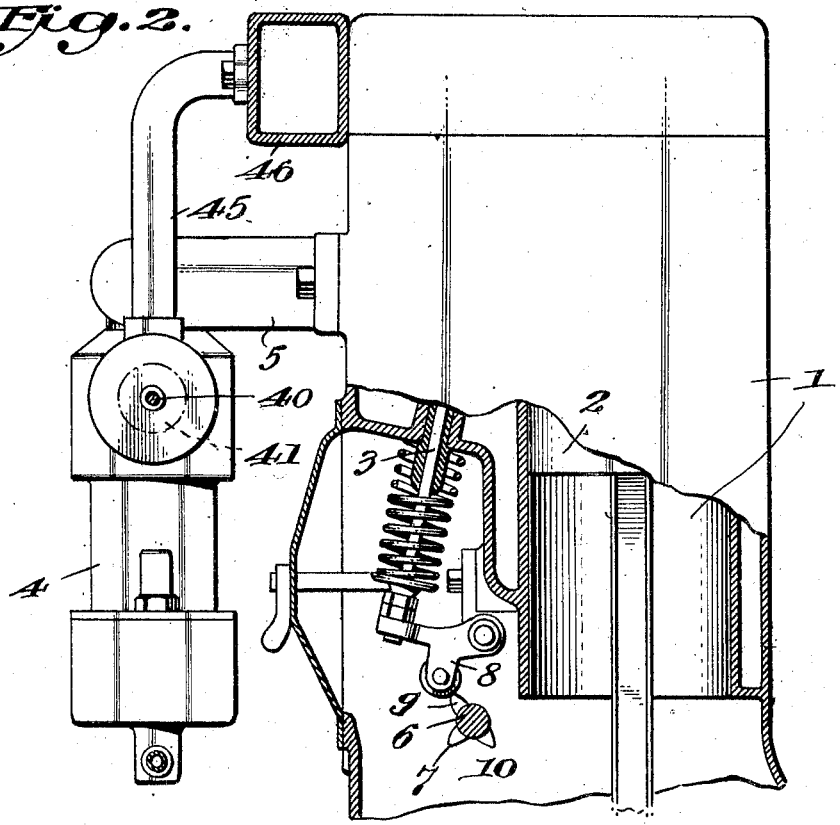
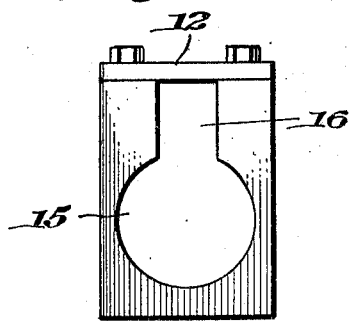
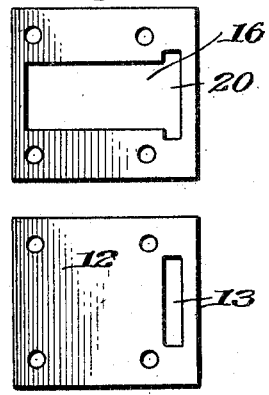
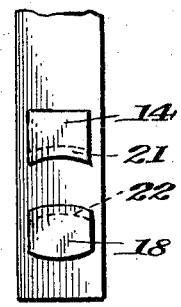
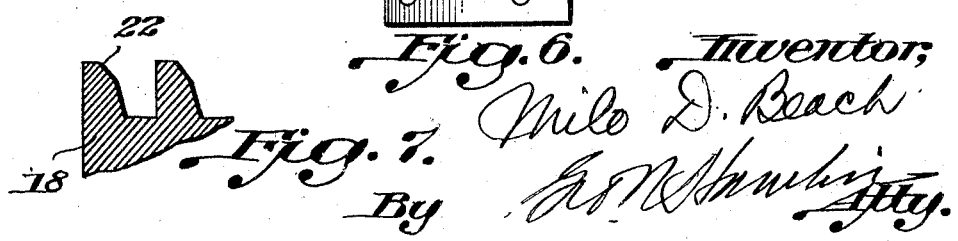

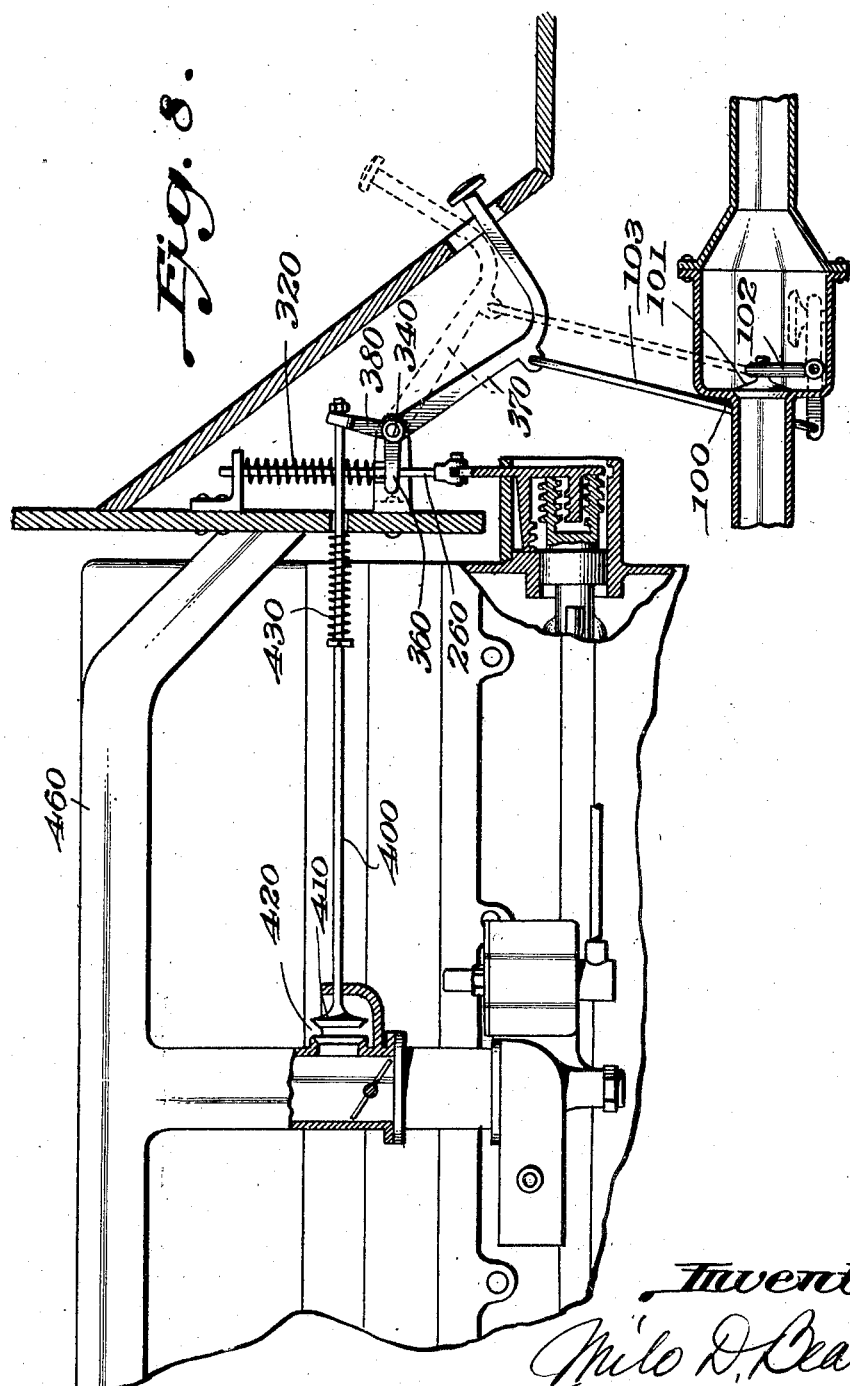

1,624,525

UNITED STATES PATENT OFFICE.

MILO D. BEACH, OF LITCHFIELD, CONNECTICUT.

METHOD AND MEANS FOR BRAKING MOTOR VEHICLES.

Application filed January 20, 1926. Serial No. 82,498.

This invention relates to a method, and means, for braking a motor vehicle by engine action and embodies improvements on the braking means set forth in my application Serial No. 670,819, filed Oct. 26, 1923.

My object is to provide novel means whereby the cam shaft will automatically shift itself under the control of the driver either to arrange the cams for normal operation of the valves or to position the supplemental cams so that they will operate the valves reversely to their normal operation to enable the compression of the engine to be used to cumulatively build up an air pressure in the cylinders and manifold to be used for braking the vehicle.

In my aforesaid application the cam shaft is manually shifted to accomplish the foregoing purpose and it was proposed therein to shift the cam shaft by hand.

Another object of the present invention is to provide means common to both the relief valve and the shiftable cam shaft whereby the same controlling or operating device, for instance a pedal, serves to effectuate both controls, whereas in my braking means of the aforesaid application the relief valve is operated independently of the means for shifting the cam shaft.

Preferably, the common controlling means for effectuating automatic shifting of the cam shaft and regulation of pressure on the relief valve embodies certain instrumentalities whereby, when the said common controlling means is operated by the foot of the driver, for instance, the automatic cam shaft shift first becomes effective and, thereafter, the braking action is determined by the pressure applied to the pedal, as the means for controlling the relief valve becomes effective after such shifting of the cam shaft has occurred.

With my present improvements, the driver need only use his left foot, just as it would be used in connection with the ordinary clutch pedal of an automobile or truck, in order to accomplish automatic shifting of the cam shaft, conversion of the engine into an air compressor, so to speak, and the control of the cumulatively built-up pressure to thereby regulate the braking action. The controlling pedal is, preferably, located adjacent the usual clutch pedal, leaving the driver's right foot free to operate the usual brake pedal in case of emergency. By using both feet the driver thus may utilize the engine to assist the service brake, thus reducing tendency of the car to skid.

With my braking means of the aforesaid application, the cam shaft had to be shifted by hand and the relief valve controlled by the foot and while the latter control was satisfactory, the necessity for taking the hand from the steering wheel in order to control the relief valve left the steering of the vehicle to the remaining hand which is attendant with danger.

The principle involved in converting the engine into an air compressor is the same as set forth in my aforesaid application but the accomplishment of shifting of the cam shaft is due to the employment of a novel duplex or right and left hand threaded arrangement on the cam shaft and on a selector which is under the control of the foot pedal. The selector is operated by means involving strong and weak springs combined with the pedal and with the air relief valve whereby the cam shaft is first shifted in one direction or the other according to the position of the selector, and the operation of the relief valve when the engine is used for braking purposes does not occur until after the selector has acted, as previously set forth.

In carrying out the invention, either the intake manifold of the exhaust manifold may be used as a compression chamber in which the pressure is cumulatively built up by the engine, hence I have shown and described embodiments of the inventive principle in connection with both the intake and the exhaust manifolds.

However, as I am aware that modifications may be resorted to in carrying out the principle of the invention, I do not limit the invention to the specific constructions which are shown and described, except as they may be recited in the claims.

In the accompanying drawings:

Figure 1 is a side elevation, partly in section, showing the invention in use;

Fig. 2 is a detail elevation, partly broken away, showing the cam shaft;

Fig. 3 is a detail elevation of the end of the housing for the shifting mechanism;

Fig. 4 is a plan view thereof, the cover being removed;

Fig. 5 is a view looking toward the jaws;
Fig. 6 is a detail view of the cover for the housing;
Fig. 7 is a detail view showing the shape of the screw threads; and
Figure 8 is a view somewhat similar to Figure 1 showing the invention as it may be carried out when the exhaust manifold, instead of the intake manifold, is utilized as a compression chamber.

The practical embodiment of the invention disclosed in the drawings is shown in connection with a well known type of internal combustion engine. It is to be understood, however, that the invention may be used in connection with any internal combustion engine employed for driving a motor vehicle.

Certain of the cylinders are designated at 1 and the pistons are shown at 2. The valves for intake and exhaust appear at 3. The carburetor is shown at 4, the intake manifold appears at 5.

The cam shaft 6 is provided with the usual cam 7 to operate the valve rocker 8 to open each valve 3 once during one revolution of the cam shaft 6 or during every two revolutions of the engine crank shaft, as usual in four-cycle engines.

To enable the engine to be converted into an air compressor for braking purposes, the cam shaft 6 is provided with a pair of diametrically opposite cams 9, 10, arranged in offset or staggered relation to the cams 7, considered in the direction of the length of the cam shaft 6, so that normally the cams 9, 10 are out of alignment with respect to the rockers 8, whereas the usual cams 7 are in alignment with said rockers.

To render the cams 9, 10, effective, and the cams 7 ineffective, so that the engine will act as an automatic brake on the vehicle when the latter is descending a grade, or is to be slowed down, the shaft 6 is mounted so that it may be slid longitudinally in its bearings, one of which is shown at 11.

Whereas in my aforesaid application I have disclosed a manual means for shifting the cam shaft 6 longitudinally, my present improvements contemplate the provision of means by which the cam shaft automatically shifts itself in both directions.

The end of the cam shaft is received in a housing constituting a continuation of the bearing 11, said housing having a cover 12 provided with a slot 13 in which the stem of the selector 14 is adapted to slide. The housing has a circular bore 15 to receive the extended end of the cam shaft 6 and above this bore is a guide 16 for the upper jaw 17 of the selector. The lower jaw 18 of the selector is received within the hollow end 19 of the cam shaft 6. An enlargement 20 in the housing serves as a guide for the stem of the selector.

The selector being adapted to be moved upwardly or downwardly in the housing, it is by the cooperation of the respective jaws 17 and 18 with the end of the cam shaft 6 that said cam shaft, due to its revolving, feeds itself in one direction or the other according to which of the jaws is engaged with it, as will now appear.

The jaw 17 has a section composed of screw threads 21 and the jaw 18 has a section of screw threads 22. The screw threads 21 and 22 are right and left, relatively speaking.

On the exterior of the extended end of the cam shaft 6 there is a circular channel or groove or blank part 23 but the remainder of said end is provided on its exterior with screw threads 24 and it has on its interior screw threads 25. The screw threads 24 and 25 are adapted to be engaged, respectively, by the screw thread sections 21 and 22 according to the position of the selector. When the selector is raised the screw thread section 22 engages the internal screw threads 25, whereupon the revolution of the cam shaft 6 causes it to automatically feed itself inwardly so as to bring the braking cams 9 and 10 into position to operate the rockers 8, and to render the usual cams 7 ineffective, thereby causing the valves 3 to be opened once for each revolution of the crank shaft to thereby effect a braking action by causing the exhaust valve to open on the down stroke of the piston and the intake valve to open on the up stroke. Consequently, when the pistons descend, air is drawn in through the exhaust valves, and when the pistons rise, the exhaust valves then close and the intake valves open so that the air previously drawn in is compressed by the rising pistons and forced into the manifold 5 and into other cylinders of the engine. This results in the pistons operating against compressed air which quickly cumulatively builds up an air resistance by which a braking action is obtained.

When the selector is lowered, the screw threads 21 engage the screw threads 24, whereupon, the screw threads 22 having become disengaged from screw threads 25, the revolution of the cam shaft 6 causes it to feed itself backwardly or to the right to assume normal position and to disengage from the screw threads 21.

There is sufficient space between the screw threads 21 and 22 to afford clearance in relation to the screw threaded end of the cam shaft so that the latter may revolve freely between the jaws when the engine is operating as a power plant or as a braking device.

The outside or exterior threads 24 are arranged oppositely to the internal screw threads 25 to permit the feeds previously described.

The groove 23 is provided to freely receive the screw threads 21 when the cam shaft 6 is in normal position for the purpose of preventing the cam shaft from accidentally moving from that position.

On the other hand, when the cam shaft 6 has been fed to the left, Fig. 1, to assume braking position, the jaw 18 rises sufficiently to prevent the cam shaft from accidentally moving back to normal position.

The backs of the screw threads 21, 22, 24, 25 are beveled for a part, or their entire lengths. This is done to prevent damage in the event that the cam shaft 6 turns backwardly or oppositely to its usual direction of revolution, the purpose being to provide a ratchet-like action which would cause the jaw which is engaged with the threads on the cam shaft to be forced off or out of engagement with the cam shaft should the engine run backward, which may occur on an incline if the automobile or truck runs backward when the clutch is still engaged.

The selector is coupled to an operating rod 26 by a pin or bolt 27. On the operating rod is an adjustable nut 28 which may be moved up or down by turning it on the screw threads 29. The operating rod is guided in a bracket 30. Interposed between the bracket 30 and the nut or collar 28 is a spring 31 which is lighter than a spring 32 surrounding the rod 26 below the nut or collar 28 and bearing on it. A collar or disk 33, slidable on rod 26, constitutes a seat for the lower end of spring 32.

A rock shaft 34 mounted in suitable brackets or bearings 35 has an arm 36 which bears against the collar 33. A pedal 37 which is secured to shaft 34 is arranged conveniently for operation by the foot of the driver. This pedal preferably is located close to the clutch pedal of the automobile so that the driver may readily transfer his foot to it.

Also carried by the shaft 34 is an arm 38 which has an adjustable bolt 39 arranged to be brought into contact with the stem 40 of the relief valve 41 after the pedal 37 has been operated a sufficient distance to effect the shifting of the cam shaft to the braking position, as will presently appear.

The relief valve 41 performs the same function as does the relief valve in my application Serial No. 670,819. It seats on a suitable seat in a chamber 42 which is connected to the manifold, being held against its seat by a spring 43 whose tension is sufficient to prevent the valve from opening during operation of the engine. The relief valve 41 is held seated against the cumulatively built-up pressure when the engine is used for braking, by the engagement of the bolt 39 with the end of the valve stem 40. According to the pressure the driver puts on the pedal 37, the valve 41 will be kept seated to utilize the braking action of the engine and when the driver lets off the pressure he exerts, the built-up air pressure is correspondingly lowered and the braking action lessened.

A check valve 44 is provided to prevent the air pressure from being forced back into the carburetor when the engine is used as a braking means but this valve is so lightly seated that it does not interfere with the sucking of the charge into the engine when the latter is used as a power plant.

I am aware that in lieu of the spring 32, sufficient space may be provided between the top of the jaw 17 and the cover 12 to permit the selector to rise after the cam shaft has fed to the left sufficiently for the jaw 18 to clear the end of the cam shaft and permit the continued movement of the arm 38 on further depression of the pedal 37, to enable the bolt 38 to engage the valve stem 40.

It is also possible to provide both right and left hand threads on the exterior of the cam shaft 6, either at different places or to have them crossed and to have the jaw 18 operating on the outside of the cam shaft instead of on the inside thereof.

Normally the cam shaft 6 is located in its right hand position so that its cam 7 operates the valve rockers 8 in the usual manner.

When the engine is to be used as a braking means, the driver depresses the pedal 37 thereby causing the arm 36 to raise the rod 26 and to elevate the selector. As the spring 32 is stiffer than the spring 31, the spring 31 will first yield, permitting the raising of the selector and bringing the threads 22 on the jaw 18 into mesh with the threads 25 on the cam shaft and as the cam shaft is revolving, it will automatically feed itself to the left into braking position to bring the cams 9 and 10 into line with the rockers 8. The engine will then act as an air compressor and it will cumulatively build up an air pressure in the manfold. When the jaw 18 clears the end of the cam shaft, the jaw 17 then strikes the cover 12 of the housing, thus arresting the selector. Upon further depression of the pedal 37, the stiffer spring 32 will yield, permitting the arm 38 to bring the bolt 39 into engagement with the end of the valve stem 40 and the operator can then hold the valve 41 onto its seat with any desired pressure, or, he may let up on the pressure his foot brings upon the pedal 37, to let off or relieve the cumulatively built up air pressure which then passes into the pipe 45 which may communicate with the exhaust manifold 46 for the purpose of reducing the noise caused by the letting off of the air pressure and to prevent the engine from receiving cold air during cold weather.

My invention is not limited to the building up of the air pressure in the intake manifold as such pressure may be built up in some other chamber.

In Figure 8 I have illustrated an embodiment of the invention which is adapted to use the exhaust manifold, instead of the intake manifold, as a chamber in which the pressure may be cumulatively built up. The principle involved is the same as previously described in connection with the embodiment utilizing the intake manifold.

The connection between the carburetor 4 and the intake manifold 5 is provided with an air inlet 420 having a seat for a valve 410. Normally the valve 410 is pressed against the seat 420 by a spring 430 operating against a collar on the valve stem 400. Furthermore, the suction of the engine, when used as a power plant, assists in holding the valve 410 on its seat.

When, however, my improvements are utilized to cause the engine to cumulatively build up a resisting pressure in the exhaust manifold 460, the valve 410 is, by the operation brought about by the driver, opened so that air can then suck in through the seat 420 into the intake manifold 5 without entering the carburetor 4.

The exhaust manifold 460 or the pipe running therefrom, is provided at some suitable point with a seat 100 against which may be seated a valve 101 which is normally in the open position shown by dotted lines so that there will be no obstruction to the free exhaust from the engine when the latter is used as a power plant. The valve 101 is mounted by a bell crank arrangement 102 one arm of which carries the valve, the other arm being operated by a link 103 which is connected to the pedal 370 by which the driver is enabled to operate the braking device as may be desired. The pedal 370 is preferably located adjacent the clutch pedal of the car as explained in connection with the description of the operation of the pedal 37.

The means used for operating the valve 410 from the pedal 370 comprises a rocker or arm 380 secured to the shaft 340 which carries the pedal 370.

The means provided in connection with the cam shaft 6 is the same as shown in Figure 1 and previously described. An operating rod 260 controls said mechanism and is itself actuated by a spring 320. The operating rod 260 is raised against the action of spring 320 by an arm or rocker 360 co-operating with a collar on said rod 260.

The valve 101 corresponds in function to the valve 41 disclosed in Figure 1. The valve 410 prevents air from entering the carburetor when the engine is used as a braking means, and, on the other hand, does not interfere with the operation of the carburetor when the engine is used as a power plant. Thus the valve 410 serves the general purpose of the valve 44 of Figure 1.

The arrangement of the pedal and connecting rod affords a quick opening and closing action of the valve as well as a powerful leverage when the valve is nearly closed, for the purpose of controlling the braking pressure cumulatively built up in the exhaust manifold.

Normally, valve 101 is open and the valve 410 is closed. When the pedal 370 is moved from the dotted line position to the full line position, Figure 8, the valve 101 is closed and the valve 410 is opened. At the same time the cam shaft mechanism, previously described in detail, has shifted the cam shaft so that the action of the engine is changed. Air is now drawn in through the seat 420 into the intake manifold 5, without air coming through the carburetor 4. The engine now begins to cumulatively build up a resisting pressure in the exhaust manifold 460, said pressure being held, or relieved, at the will of the driver, according to the pressure he maintains on the pedal 370 which is then in the full line position. The lighter the pressure on the pedal 370, the less the braking action exerted. When the pedal 370 is released the springs restore the parts to normal position and the cam shaft draws it back to the position shown in Figure 1.

What I claim is:—

1. In means for braking a motor vehicle by the use of the internal combustion engine thereof wherein the cam shaft is shifted, the combination with the cam shaft, of means co-operating therewith, and controllable at the will of the operator, adapted for utilizing the motion of the engine to automatically shift it from normal position to braking position, and vice versa.

2. In means for braking a motor vehicle by the use of the internal combustion engine thereof wherein the cam shaft is shifted, the combination with the cam shaft, and right and left hand screw threads carried by the cam shaft, of means engageable with said right and left hand screw threads at different times, and controllable at the will of the operator, adapted for utilizing the revolution of the cam shaft to cause said right and left hand screw threads to shift said shaft from normal position to braking position, and vice versa.

3. In means for braking a motor vehicle by the use of the internal combustion engine thereof wherein the cam shaft is shifted, the combination with the cam shaft, and right and left hand screw threads carried by the cam shaft, of a selector having right and left hand screw threads respectively engageable with the threads carried by the cam shaft, and controllable at the will of the operator, adapted for utilizing the revolution of the cam shaft to shift said shaft from normal position to braking position, and vice versa.

4. An internal combustion engine having intake and exhaust valves, operating means for said valves adapted to be set to cause the valves to operate in the usual manner, or, for reversing the action of said valves so that the engine will be converted into an air compressor whereby the pistons will cumulatively build up a resisting air pressure to check instrokes of the pistons, means for controlling the cumulatively built-up air pressure thus provided, whereby the braking action may be regulated, and means common to the controllable valve operating means and to the means for controlling the cumulatively built-up air pressure, whereby both are subject to a common control by the operator.

5. An internal combustion engine having intake and exhaust valves, operating means for said valves adapted to be set to cause the valves to operate in the usual manner, or, for reversing the action of said valves so that the engine will be converted into an air compressor whereby the pistons will cumulatively build up a resisting air pressure to check instrokes of the pistons, means for controlling the cumulatively built-up air pressure thus provided, whereby the braking action may be regulated, and means having operative connections to the controllable valve operating means and to the means for controlling the cumulatively built-up air pressure, said operative connections enabling the controllable valve operating means and the air pressure controlling means to be operated in succession to enable the operator by a single operation to first convert the engine into an air compressor and thereafter to regulate the air pressure cumulatively built-up for utilization for braking purposes.

6. In means for braking a motor vehicle by the use of the internal combustion engine thereof, wherein the cam shaft is shifted, the combination with the cam shaft, and right and left hand screw threads carried by the cam shaft, of a selector having right and left hand screw threads respectively engageable with the aforesaid threads and adapted for utilization to cause the cam shaft to automatically shift itself in one direction or the other according to the threads of the selector which are engaged with the threads of the cam shaft, means for controlling the air pressure built-up by the engine when it is converted into an air compressor on shifting the cam shaft out of normal position, and a foot pedal for operation by the driver which exercises a common control on the selector and on the air pressure controlling means aforesaid.

In testimony whereof I affix my signature.

MILO D. BEACH.